Dec. 7, 1948.   T. A. ANDERER ET AL   2,455,347
VARI-LENGTH TANDEM SELF-ALIGNING GAUGE
Filed July 3, 1946

INVENTOR.
THEODORE A. ANDERER.
ROBERT W. TAFEL.
BY J. H. Church & H. E. Thibodeau
ATTORNEYS Patented Dec. 7, 1948

2,455,347

UNITED STATES PATENT OFFICE 2,455,347

VARILENGTH TANDEM SELF-ALIGNING GAUGE

Theodore A. Anderer, Philadelphia, and Robert W. Tafel, Drexel Hill, Pa.

Application July 3, 1946, Serial No. 681,282

4 Claims. (Cl. 33—178B)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to gages used in measuring the conformity of cylindrical and other objects to predetermined ranges of diametrical dimension.

Broadly stated, the object of our invention is to improve the performance and simplify the operation of gages useful in checking the external diameter of cylinders or the corresponding dimension of other specimens.

A more specific object is to reduce the number of operations heretofore considered most practical for gaging the overall dimensions of cylindrical and other objects.

Another object is to provide improved means for positive selection of specimens whose lengths may variously exceed the depth of the "go" gage bore, but which specimens are within acceptable external diametrical limits.

A further object is to reduce the time required to check external dimensions of specimens over gaging methods previously used.

A still further object is to improve the economy of gage operation and increase the life of gage ring elements.

This invention is an improvement over our earlier form "progressive" type gage first disclosed by our co-pending application Serial No. 574,936 for "Tandem self-aligning gage," which was filed on January 27, 1945, and is now Patent No. 2,402,142, granted on June 18, 1946. One preferred form of our present improvement in external dimension gages is shown by the accompanying drawings wherein.

Requirements of external dimension gages

Figure 1:
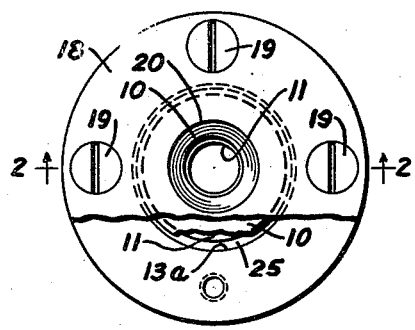
Fig. 1 is a top plan view of our improved gage assembly with certain portions thereof cut away to show the respective diametrical relationships of the assembly's two gaging rings.

The manufacture of numerous types of cylindrical and other similar objects requires a close and accurate check on the objects' diametrical dimensions for acceptance within minimum and maximum dimensional limits. Such measurements are usually made by employing in succession two separate gages commonly characterized "go" and "no go." These terms will hereinafter be used in this specification.

The "go" gage typically takes the form of a ring having an internal diameter equal to that of a desired maximum dimensional tolerance; the "no go" gage typically has a similar ring-like shape but is of smaller internal diameter equal to that of a desired minimum dimensional limitation. By means of such gaging elements, cylinders and other specimens having over or undersized diameters can be readily rejected.

Failure of the specimen to gain entrance into the "go" gage indicates that the specimen is too large. Penetration into the "go" gage shows the specimen not to be oversized, and attempted introduction into the "no go" gage then is in order. Failure to gain admittance into the "no go" gage shows the specimen's external dimension not to be undersized; and, conversely, passage therethrough shows a dimension below the acceptable limit.

Our improved construction

Illustrated by the drawings is a unit which incorporates one preferred form of the improvements of our invention. That unit utilizes the unique tandem construction shown wherein the "no go" gaging element 11 is placed behind or below the "go" gaging element 10 in a common or unitary frame 12 by which both of these elements are supported.

This frame 12 may take the form of a cylinder or block of any suitably rigid material such as metal or plastic. Extending centrally into this frame 12 is a circular cavity defined by the frame's inner walls. This cavity has two different bore diameters which together serve to accommodate the two gaging elements in the illustrated tandem relationship. The first or larger diameter is nearest the entrance to the gage, and its axial depth is sufficient to define a bore 13a which receives "go" element 10. To the rear of this first bore 13a is a second or smaller bore 13b which comprises the remainder of the cavity and preferably has a much larger axial depth than bore 13a, as the drawings show. Bore 13b accommodates the "no go" element 11 and permits same to move axially back and forth therein.

Located within the same smaller bore 13b behind the "no go" element 11 is a spring 14 or other resilient means which supports and constantly urges that element forward towards the "go" element 10. The end of spring 14 which is not in contact with "no go" element 11 is retained within bore 13b by the radially inward extensions 15 of a base plate 16 which is conveniently fastened by two or more screws 17 to the rear of frame 12 (see Fig. 2).

The "no go" element 11 has an overall diameter only slightly less than frame 12's central bore 13b. This element may be inserted into that bore in close fitting relationship therewith (see Figs. 2–2A) from either end of the frame, and the same choice of insertion applies to spring 14 since the overall diameters of both the element 11 and the spring are less than the minimum diameter of both bores 13a and 13b.

Figures 2, 2A:
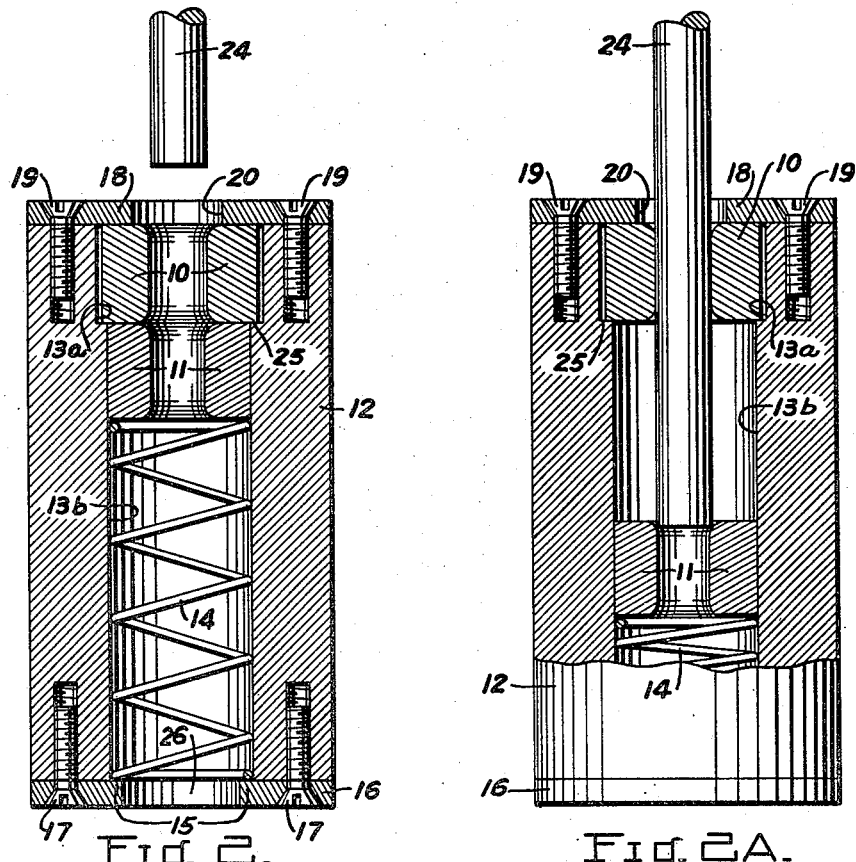
Fig. 2 is a sectional view along line 2—2 of Fig. 1 showing the internal construction of that tandem, self-aligning unit together with a cylindrical specimen about to be inserted therein.
Fig. 2A duplicates the Fig. 2 view except to show the operation of our new gage which enables the gaging of a cylindrical specimen that is longer than the first or "go" gage.

The "go" element 10 is placed in the frame's forward central cavity to axially fill bore 13a. Thus situated, this element's base or rearward end rests upon a "shelf" 25 which comprises the internal terminus of bore 13a at the line of its jointure with the smaller bore 13b. The overall depth of this gage element is preferably (though not necessarily) such that the axial depth of bore 13a is substantially filled as shown in Figs. 2–2A, for reasons which will later become apparent.

A retaining cover plate 18, very similar to base plate 16, is secured to the front end of the gage frame 12 by two or more screws 19. This plate 18 serves to restrain gage elements 10—11 and spring 14 against exiting from the frame's front end, just as plate 16 acts to prevent element 11 and spring 14 from dropping out of the frame's rear end.

Cover plate 18 has a central opening 20 whose diameter is larger than the gaging bore of "go" element 10, but smaller than the frame's bore 13a. Similarly, rear plate 16 has a central opening 26 (see Fig. 2) coaxial with opening 20 and the bore 13. This rear plate opening 26 is of a diameter larger than that of "no go" element 11's gaging bore, but smaller than the frame's bore 13b (which thereby provides the earlier mentioned extensions 15 that support the rear end of spring 15).

Actually, the frame 12 and illustrated gage assembly may be conveniently modified in numerous ways to suit the desires and needs of the gage user or manufacturer. For example, the rear plate 16 is not essential and may be eliminated by combining its central opening 26 and radial extensions 15 in the fabrication of frame 12. With such a design, the only change would concern the installation of elements 11 and spring 14, their insertion thereafter having to be made through the front end of the frame (when cover plate 18 is removed) rather than through the rear end.

The "go" gaging element 10 has an outside diameter which is appreciably smaller than that of the frame's forward bore 13a. This leaves around element 10's outer wall a space of the character which Figs. 2–2A illustratively show. Such a space permits the "go" element 10 to have a small amount of lateral motion.

As the drawings show, both ends of the bore openings which extend through each of the two gage rings or elements 10—11 are chamfered to facilitate entrance of the specimens therein. The chamfered mouths of the opening in the "no go" element 11 each have a diameter represented to be slightly larger than the diameter of "go" ring 10's chamfered mouths. This factor, together with the free moving "go" element construction just outlined, enables the self-aligning features of our invention to operate in a manner later to be described.

The sizes of the openings which extend through each of the two gage elements 10—11 will, of course, depend on the diametrical tolerance permitted for the specimens to be gaged. As previously explained, the internal diameter of the "go" element 10 will be that of the maximum overall diameter permitted for the object to be checked; and the internal diameter of the "no go" element 11 will be that of the minimum overall diameter called for in the tolerance specifications of the specimens to be gaged.

*Illustrative gage operation*

Fig. 2 shows a cylindrical object 24 whose external or overall diameter is about to be gaged by means of our improved device. The tolerances permitted for this diameter in our illustrative example are a maximum of 0.8750 inch and a minimum of 0.8125 inch. Thus, the former dimension represents the internal diameter of the "go" element 10 and the smaller dimension represents the internal diameter of the "no go" element 11.

The cylindrical specimen 24 has, in our illustrative example, an overall diameter of 0.8438 inch. The specimen 24 is inserted through opening 20 in our gaging device's retaining cover plate 18 and directed into the opening in the "go" element therebeneath. Entrance into the "go" ring 10 is facilitated by the chamfer which slightly widens the diameter of each end of this element's central opening. The specimen 24, being of lesser diameter than the 0.8750 inch "go" element 10's opening will gain entrance therein.

Continued downward pressure furnished the specimen 24 enables it to be lined up immediately over the central opening through the adjacent "no go" gaging element 11 (see Fig. 2). This self-alignment is effected by contact of the specimen 24 with the chamfered edge of the opening in the "no go" ring.

The specially widened entrance into this opening, having a 0.9375 inch diameter in our illustrative example, is larger than the 0.8750 inch maximum diameter of any specimen which can pass through the "go" ring 10. The specimen 24 is thus readily admitted into the mouth of the "no go" opening. To further penetrate within the "no go" ring the specimen's diameter must, of course, be less than the internal diameter of the opening which extends through this element.

The free or "floating" movement of the "go" ring 10 permits the specimen to center itself in the "no go" ring 11's central opening, but is sufficiently restricted by the limited clearance surrounding the "go" ring (see Figs. 2–2A) to prevent a cocking of the specimen 24, and also to prevent excessive misalignment between that specimen and the "no go" element's opening therebeneath.

This cocking effect will frequently occur when attempts are made to insert an object such as the specimen 24 into immovable fixtures having close fitting openings such as in elements 10 or 11. The result is to give the operator the false impression that the specimen is oversize should cocking prevent entry into the first or "maximum size" gage, or to erroneously cause the operator to approve a specimen which enters the "go" element but fails to enter the "no go" element.

Once the specimen 24 gains entrance into the "go" element 10's opening and is lined up over the "no go" element 11, failure to enter into element 11's opening indicates the specimen's diameter to be within allowable limits. Should the specimen 24 gain admittance into "no go" element 11, the operator will reject such specimen as being undersized. Since our illustrative specimen 24's assumed overall diameter of 0.8438 inch is larger than the 0.8125 inch "no go" gage 11's opening, that specimen will not be admitted therein, and hence will be accepted by the inspector making the test.

The foregoing description of the gage's operation explains the operation of the earlier inventive advances which we made and disclosed in our aforementioned co-pending application Ser. No. 574,936. The gage there described, however, was limited in that it could not properly test the diameters of specimens at points whose distances from the specimens' ends were greater than the depth of the "go" element 10's gaging bore. Thus, with that earlier invention, it has been necessary to use separate gage units for testing specimens having equivalent diametrical tolerances, but varying lengths (especially lengths in excess of the "go" gage's bore depth).

Our present invention overcomes this shortcoming. With our new gage it is now possible to get all the advantages of its predecessor (Ser. No. 574,936) and, in addition, the user can now employ a single gage unit to measure specimens having uniform diametrical tolerances, even though the specimens' lengths are spread over a comparatively large range.

Thus, when specimen 24 is within its allowable diametrical tolerances, upon being inserted through the gaging bore of "go" element 10, it will contact but fail to enter the bore of the second gage ring. Instead that "no go" element 11 will yield before the pressure of specimen 24 (which overcomes the resistance offered by spring 14) and move rearwardly from its normal Fig. 2 position in the direction and manner shown by Fig. 2A.

As the drawings show, the cross-sectional diameters of the entire length of specimen 24 will be thus made to pass through "go" element 10—if, in fact, the specimen 24 has no part of its entire length whose cross-section exceeds the maximum diameter that the "go" ring can accommodate. Should any part of the specimen's length have a cross-section in excess of the maximum desired, that part of the specimen will be unable to gain entrance into the "go" element 10 and this fact will be notice to the operator of the specimen's non-conformance with specifications.

Of course, like our earlier form tandem self-aligning gage (co-pending application Ser. 574,936), an undersized specimen, i. e., one whose entire length has an overall diameter less than that of the "no go" element's gaging bore, will pass directly through both elements 10—11 and drop out through hole 26 in rear plate 16.

Advantages over prior constructions

In our aforementioned co-pending application Ser. 574,936, filed March 22, 1946, for "Tandem self-aligning gage," we discussed at length the state of the gage prior art which that invention had so materially improved. Summarizing some of the advantages then attained by our early form improvements we find that our "floating" type tandem or single insertion "progressive" gage saved considerable gaging time over the lateral "go" and "no go" construction which required a "two step" insertion process.

In addition, troublesome cocking of the test specimen which frequently occurs with the side-by-side or lateral gage ring construction, was practically eliminated by our tandem gage. A still further fault which our improvements overcame was the elimination of screw or other means for tightening the gage rings into the holder which so often deformed the gaging elements. Additional advantages of accuracy and economy were further shown for our unique "floating" tandem gage over the prior art "rigid" type of tandem construction.

Our present improvement here described and illustrated quite obviously possesses all the advantages had by our device of Ser. 574,936, and in supplement thereto, has the earlier mentioned further asset of being able, with a single unit, to gage cylindrical objects having many varying lengths. Thus, a definite economy in gage manufacture is achieved, for only one gage unit need be made to cover a large range of specimens having equivalent diameters but possibly many different lengths. It will be apparent, too, that aside from economy there is a definite advantage in convenience given the gaging inspector who now can measure many sizes of test specimens with but a single gage unit.

Summary

The improvements of our invention have been described, in one instance, as being used to measure the overall diameters of cylinders having certain arbitrarily selected dimensional tolerances. It will be apparent, however, that such description is by way of illustration rather than restriction. Such diametrical measurements may be similarly gaged on cylindrical or other specimens of almost any dimensions which may be handled conveniently.

It will thus be seen that by our invention we have improved the performance and simplified the operation of gages useful in checking the external diameter of cylindrical and other specimens; that we have reduced the number of operations heretofore considered most practical for gaging the overall dimensions of such specimens; that we have provided improved means for positive selection of specimens whose lengths may variously exceed the depth of the "go" gage bore, but which are within acceptable external diametrical limits; that we have reduced the time required to check external dimensions of specimens over gaging methods previously used; and that we have improved the economy of gage operation and increased the life of the gage ring elements.

Our inventive improvements are therefore extensive in their adaption and are not to be restricted to the specific form here disclosed by way of illustration.

We claim:

1. In a device for checking the external diameter of cylindrical and other objects, the combination of a first or "go" gaging element having an internal diameter equal to a desired maximum dimension for the objects to be checked, a second or "no go" gaging element having an internal diameter equal to a desired minimum dimension for said objects, means in the form of a unitary frame for supporting said first and second elements in tandem and substantially coaxial relation with the second or "no go" element movably held in the rear portion of said frame so as to be free for axial movement therein and with the first or "go" element movably positioned in the frame's forward portion so as to be free for limited lateral shifting with respect to said second element, and resilient means in said frame behind said second element which is thereby urged forward to abut said first element when no object is being checked, but which is moved rearwardly within the limits of the frame upon being contacted by an object having a diameter sufficiently small to permit its passage through said first element although not small enough to enter the bore of said second element.

2. In a device for checking the external diameters of cylindrical and other objects, the combination of a first or "go" gaging element having an internal diameter equal to a desired maximum dimension for the objects to be checked, a second or "no go" gaging element having an internal diameter equal to a desired minimum dimension for said objects, a unitary frame surrounding both of said elements and supporting same in tandem and substantially co-axial relation and permitting axial insertion of said objects into and through the first or "go" element and thence into the second or "no go" element, means including said frame for movably positioning said first element therein in a way which permits limited freedom for lateral shifting with respect to said second element, and resilient means normally extended so as to hold said second element adjacent to and abutting the rear end of said first element but also capable of being compressed so that said second element may be moved rearwardly within the frame limits upon being contacted by an object to be checked whose diameter is sufficiently small to enable its passage through the said first element but is too large to enable the object's entrance into the second element.

3. In a device for checking the external diameter of cylindrical and other objects, the combination of a frame-like holder from whose forward end extends thereinto a substantially circular cavity consisting of a forward portion and continuous therewith a diametrically smaller rearward portion, a "no go" gage ring having an internal diameter equal to a desired minimum dimension for the objects to be checked and being positioned in the narrower rear portion of the cavity so as to be free for axial movement therein, a "go" gage ring having an internal diameter equal to a desired maximum dimension for said object and being supportably positioned in the broader forward portion of said holder cavity in co-axial tandem relation to said "no go" ring and there free for limited lateral shifting with respect to the "no go" ring, resilient means in said holder cavity behind said second element which is thereby urged forward to abut said first element when no object is being checked but which second element is axially moved rearward when contacted by an object to be checked whose diameter is too large to permit its entrance thereinto, means at said holder's forward end for retaining said "go" ring in said cavity's forward broad portion while permitting axial insertion of said objects thereinto and therethrough to the adjacent "no go" ring in the cavity's rear narrow portion, and means at said holder's rear end for retaining said "no go" ring and said resilient means within the cavity's rear portion as aforesaid while permitting axial emergence therefrom of said objects whose diameters are less than that of the "no go" gage bore.

4. In a device for checking the external diameter of cylindrical and other objects, the combination of a frame-like holder formed of a rigid material and having a first central cavity extending part-way therein from the holder's forward end to connect with a concentric second cavity of reduced diameter that extends to the holder's rear end, a "go" gage ring having an internal diameter equal to a desired maximum dimension for said objects and being freely positioned in said frame's first cavity for limited lateral shifting with respect thereto, a "no go" gage ring having an internal diameter equal to a desired minimum dimension for the objects to be checked and being held in said frame's second cavity where it is free for axial but non-lateral shifting, resilient means behind said "no go" ring which is thereby urged forward to abut said first element when no object is being checked but also is capable of being moved rearwardly upon being contacted by an object to be checked whose diameter is too large to enable its entrance into the "no go" ring, a cover plate having a central opening larger than that of said "go" ring's bore but smaller than the diameter of said holder's first cavity attached to the holder's forward end and there serving to retain said "go" ring in that first cavity, and a base plate having a central opening larger than that of said "no go" ring's bore but smaller than the diameter of the holder's second cavity attached to the holder's rear end and there serving to retain both said "no go" ring and resilient means in that second cavity.

THEODORE A. ANDERER.
ROBERT W. TAFEL.

REFERENCES CITED

The following references are of record in the file of this patent:

UNITED STATES PATENTS

| Number | Name | Date |
|---|---|---|
| 2,402,142 | Anderer et al. | June 18, 1946 |